James E. Emerson.

Improvement in Saws.

PATENTED JUN 27 1871

116421

Witnesses:
Jo. n F. Fennell.

Inventor:
James E. Emerson
By Newton Crawford
his attorney

116,421

UNITED STATES PATENT OFFICE.

JAMES E. EMERSON, OF TRENTON, NEW JERSEY.

IMPROVEMENT IN SAWS.

Specification forming part of Letters Patent No. 116,421, dated June 27, 1871.

*To all whom it may concern:*

Be it known that I, JAMES E. EMERSON, of Trenton, in the county of Mercer, in the State of New Jersey, have made certain Improvements in Saws, of which the following is a specification:

The invention relates to an improvement which is applicable to saws with solid or insertible teeth; and the object is to provide in a saw, while in the process of manufacture, a means of gumming or removing a portion of the saw-plate or insertible tooth, as the case may be, in the line of wear in filing the tooth back into the saw-plate, in such manner as that when the saw-plate or tooth is filed back a certain distance a piece of the plate or tooth will be loosened and readily be detached from the plate or tooth, and thereby avoid the process of gumming the saw in order to keep the teeth in proper shape and length; and it consists in the slitting or punching, by a die of proper shape, crescent or other shaped slits in the saw-plate or tooth, and forcing the pieces partially cut out back to their exact position occupied before slitting or punching.

Figure 1:
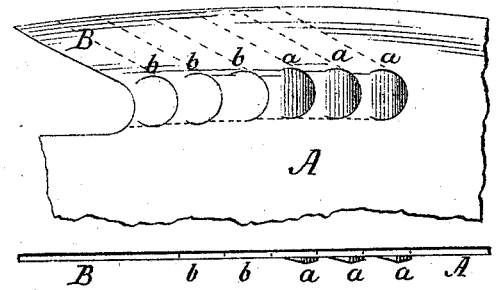
Figure 2:
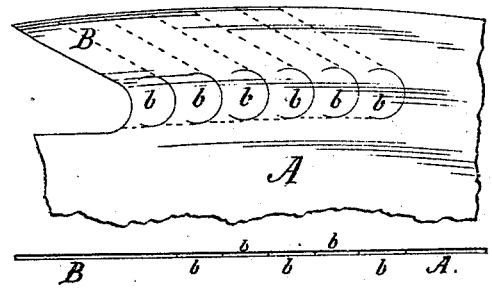
Figure 3:
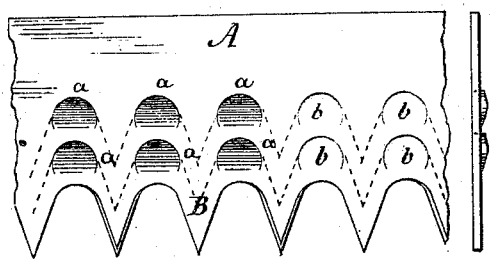
Figure 4:
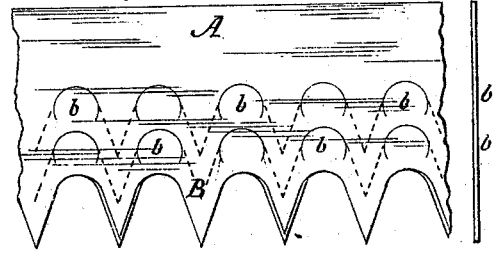
Figure 5:
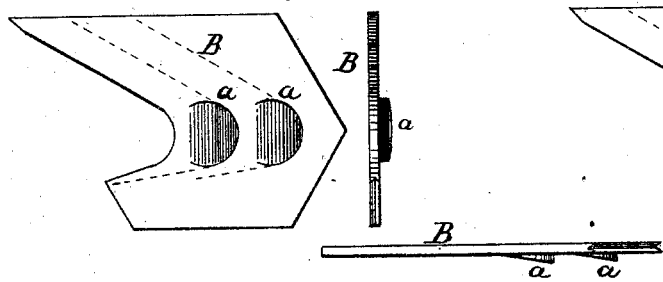
Figure 6:
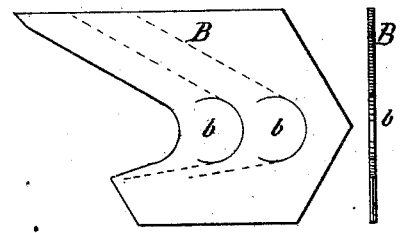

In the drawing, Figure 1 represents a side and edge view of a section of a circular saw unfinished, with the plate of the saw punched or slit. Fig. 2 represents the same section with the pieces partially cut out of the plate forced back and in a finished state; Figs. 3 and 4, the same invention applied to crosscut-saws; and Figs. 5 and 6, the same applied to insertible teeth of saws.

A represents the plate of a saw; B, the teeth, whether insertible or solid; *a a a*, in Figs. 1, 3, and 5, the plate or tooth punched or slitted by applying a punch, with an inclined or other proper shape, on its actuating end to make the desired slit without cutting all the metal out of the plate, but leaving a portion toward the throat or base of the teeth uncut, as seen in all the figures of the drawing; *b b b*, the piece that is partially punched or slit when it is driven back into the saw-plate or tooth to be finished or in a finished state.

Heretofore, and in view of avoiding wholly the operation of gumming saws by a machine, holes have been punched entirely out of the saw-plate or tooth in the line of the wear of the throat of the teeth, leaving only a slight bar of the plate or tooth between the holes so punched out. This construction weakens the saw, and the plate or teeth so punched could not stand so great a strain as is sometimes put upon them without being permanently bent or sprung, by which weakness the best use of the saw is entirely lost. Another difficulty to overcome is the tendency for dust and gum to fill the holes so made, and thereby increase the friction of the saw in its use, and consequently requiring more power to accomplish the same amount of work. A further annoyance exists where the holes are punched through the plate or tooth, and that is the shrill whistle caused by the action of the saw with the holes in the plate or tooth passing rapidly through the air, as a circular saw doing good work will have to do, making it disagreeable to all, and to many impossible to long endure such sound.

By my invention of partially punching out or slitting the plate, and forcing the part cut back into the plate, all these difficulties and annoyances are obviated, as the saw or tooth with the piece partially cut out, when forced back to its place in the plate or tooth, bears at all parts of the slit so as to sustain the saw in any strain placed upon it. No dust or gum can adhere to the plate or tooth by reason of the partial displacement of the piece *a*, for when driven back to its original position, as it is before the saw is tempered and ground or finished, no space is left for dust or gum to adhere, as the surface is as smooth after being ground as though no slit or punch had been made; nor can there be more noise, when this construction is made upon a circular saw and the saw in rapid motion, than there is where the plate or tooth is solid and not slit or punched at all, as the slit, when properly done, can hardly be detected after the saw is finished. This process of punching or slitting the plate or tooth, and forcing the piece partially removed back to its original position, is done after the teeth (if solid-teeth saws are made) are cut in the plate, or, if insertible teeth are used, after the tooth is shaped, and while the steel is in a soft and annealed state; consequently, no obstacle is in the way of tempering and finishing in the usual way, and, when successfully done, the saw-plate or tooth appears sound and as if never punched or slit. The slits thus made answer no purpose until the continual filing of the saw brings the shape of the teeth as seen in dotted lines, when the piece that had been previously partially punched out will come out, or, by a blow of a hammer, can be displaced from the plate, as all the uncut or solid part of the metal between the original throat and the slit has been cut away in filing.

This invention is applicable to all saws, whether reciprocating, circular, cross-cut, or hand-saws, and to insertible teeth of saws for any and every kind of use. The slits may be angular or of other forms when desired.

Having thus described my invention, I wish it to be distinctly understood that I lay no claim in this application to the invention described and claimed in patent No. 66,692, and dated July 16, 1867; nor do I claim for a clean punched-out hole or aperture, or a series of holes, in a saw-blade or plate for any purpose, as such holes or a series of holes in a saw-blade are in use, and the invention herein described is entirely different; but

What I claim, and desire to secure by Letters Patent, is—

A saw having piece *a* partially slit or punched from plate A or tooth B, in the manner and for the purpose shown and described.

J. E. EMERSON.

Witnesses:
NEWTON CRAWFORD,
JOHN F. FENNEL.